United States Patent
Wang et al.

(10) Patent No.: US 8,051,537 B2
(45) Date of Patent: Nov. 8, 2011

(54) HINGE ASSEMBLY

(75) Inventors: Jin-Xin Wang, Shenzhen (CN); Chao-Zhong Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 448 days.

(21) Appl. No.: 12/337,763

(22) Filed: Dec. 18, 2008

(65) Prior Publication Data

US 2010/0071156 A1    Mar. 25, 2010

(30) Foreign Application Priority Data

Sep. 22, 2008  (CN) .......................... 2008 1 0304599

(51) Int. Cl.
    *E05D 11/10*    (2006.01)
(52) U.S. Cl. ........................................................ 16/330
(58) Field of Classification Search ............ 16/337–339, 16/342, 330, 303, 374, 376, 377, 340, 355, 16/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 5,109,570 A * | 5/1992 | Okada et al. | | 16/289 |
| 5,269,047 A * | 12/1993 | Lu | | 16/340 |
| 6,125,507 A * | 10/2000 | Katoh | | 16/329 |
| 6,539,582 B1 * | 4/2003 | Chae | | 16/340 |
| 6,568,034 B2 * | 5/2003 | Cho | | 16/337 |
| 6,862,779 B1 * | 3/2005 | Lu et al. | | 16/340 |
| 7,082,642 B2 * | 8/2006 | Su | | 16/340 |
| 7,603,747 B2 * | 10/2009 | Ho et al. | | 16/330 |
| 2007/0094842 A1 * | 5/2007 | Chang | | 16/330 |
| 2007/0136992 A1 * | 6/2007 | Lu et al. | | 16/330 |
| 2007/0169312 A1 * | 7/2007 | Ho et al. | | 16/330 |
| 2007/0199179 A1 * | 8/2007 | Wang | | 16/340 |

* cited by examiner

*Primary Examiner* — Chuck Y. Mah
(74) *Attorney, Agent, or Firm* — Altis Law Group, Inc.

(57) ABSTRACT

An exemplary hinge assembly includes a rotatable shaft, a rotatable stand, a fixed stand, an elastic member, and a retaining ring. The rotatable stand is non-rotatably connected to the rotatable shaft. The fixed stand and an elastic member are connected to the rotatable shaft. A flange is formed on a proximal end of the rotatable shaft, and a positioning groove is defined in a distal end of the rotatable shaft. The rotatable stand, the fixed stand and the elastic member are positioned between the flange and the positioning groove of the rotatable shaft. The retaining ring engages in the positioning groove of the rotatable shaft, thereby producing an elastic force along the rotatable shaft.

13 Claims, 4 Drawing Sheets

HINGE ASSEMBLY

BACKGROUND

1. Technical Field

The present disclosure relates generally to hinge assemblies and, more particularly, to a hinge assembly for electronic device.

2. Description of the Related Art

An electronic device such as a mobile phone, a notebook computer, or a personal digital assistant (PDA) generally has a main body and a cover with a display and a camera lens pivotally mounted on the main body via a typical hinge assembly.

Referring to FIG. 4, the typical hinge assembly 10 includes a shaft 11, a rotatable stand 12, a fixed stand 13, a restricting member 14, a cam 15, a cam follower 16, a plurality of spring washers 17, and a nut 18. A cross-section of the shaft 11 perpendicular to an axis of the shaft 11 is double-D shaped. A flange 111 is formed on a proximal end of the shaft 11, and a threaded portion 112 is formed on a distal end of the shaft 11. The rotatable stand 12 defines a pivot hole 121 for receiving the distal end of the shaft 11. A limiting protrusion 122 is formed on the rotatable stand 12 adjacent to the pivot hole 121. The rotatable stand 12 also defines a fixing hole 123 adjacent to the pivot hole 121. The fixed stand 13 defines a through hole 131 for receiving the proximal end of the shaft 11. The restricting member 14 defines an assembling hole 141 in a center portion of the restricting member 14. The restricting member 14 defines a limiting groove 142 in an edge portion of the restricting member 14. The cam 15 defines a cam hole 151 for receiving the distal end of the shaft 11. A fixing pole 152 extends from the cam 15. Two protrusions (not shown) opposite to each other are formed on a side surface of the cam 15 adjacent to the cam hole 151. A center of the cam follower 16 defines a pivot hole 161 for receiving the distal end of the shaft 11. The cam follower 16 defines two cutouts 162 on the cam follower 16 surrounding the pivot hole 161. The cutouts 162 are configured for engaging with the protrusions of the cam 15. The through hole 131 of the fixed stand 13, the cam hole 151 of the cam 15, and the pivot hole 161 of the cam follower 16 are non-circular holes corresponding to the shape of the cross-section of the shaft 11. The restricting member 14, the cam 15, and the cam follower 16 are generally made of a metal via powder metallurgy technique, to get a high rigidity and durability. The rotatable stand 12 and the fixed stand 13 are generally made of an alloy with a low rigidity, to reduce the manufacturing cost of the hinge assembly 10.

In assembling the hinge assembly 10, the threaded portion 112 of the shaft 11 extends through the assembling hole 141 of the restricting member 14, the pivot hole 121 of the rotatable stand 12, the cam hole 151 of the cam 15, the pivot hole 161 of the cam follower 16, the spring washers 17, and finally engages with the nut 18. The fixed stand 13 is fixed to the shaft 11 and touches the flange 111. The fixing pole 152 is inserted into the fixing hole 123 of the rotatable stand 12. The fixed stand 13, the restricting member 14, the cam follower 16 is non-rotatably connected to the shaft 11.

In use, the fixed stand 13 is rotated relative to the rotatable stand 12, and drives the shaft 11 to rotate, thus driving the restricting member 14 and the cam follower 16 to rotate. The limiting protrusion 122 of the rotatable stand 12 slides in the limiting groove 142 of the restricting member 14, in order to define a rotating angle range between the rotatable stand 12 and the fixed stand 13.

However, in assembling the hinge assembly 10, the nut 18 should be adjusted on the threaded portion 112 of the shaft 11 for a period of time, so that the spring washers 17 can produce an appropriate elastic force along the shaft 11. Therefore, an assembling efficiency of the hinge assembly 10 is low.

Therefore, a hinge assembly to solve the aforementioned problems is desired.

SUMMARY

An exemplary hinge assembly includes a rotatable shaft, a rotatable stand, a fixed stand, an elastic member, and a retaining ring. The rotatable stand is non-rotatably connected to the rotatable shaft. The fixed stand and an elastic member are connected to the rotatable shaft. A flange is formed on a proximal end of the rotatable shaft, and a positioning groove is defined in a distal end of the rotatable shaft. The rotatable stand, the fixed stand and the elastic member are positioned between the flange and the positioning groove of the rotatable shaft. The retaining ring engages in the positioning groove of the rotatable shaft, thereby producing an elastic force along the rotatable shaft.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

References will now be made to the drawings to describe embodiments of the present hinge assembly, in detail.

Figure 1:
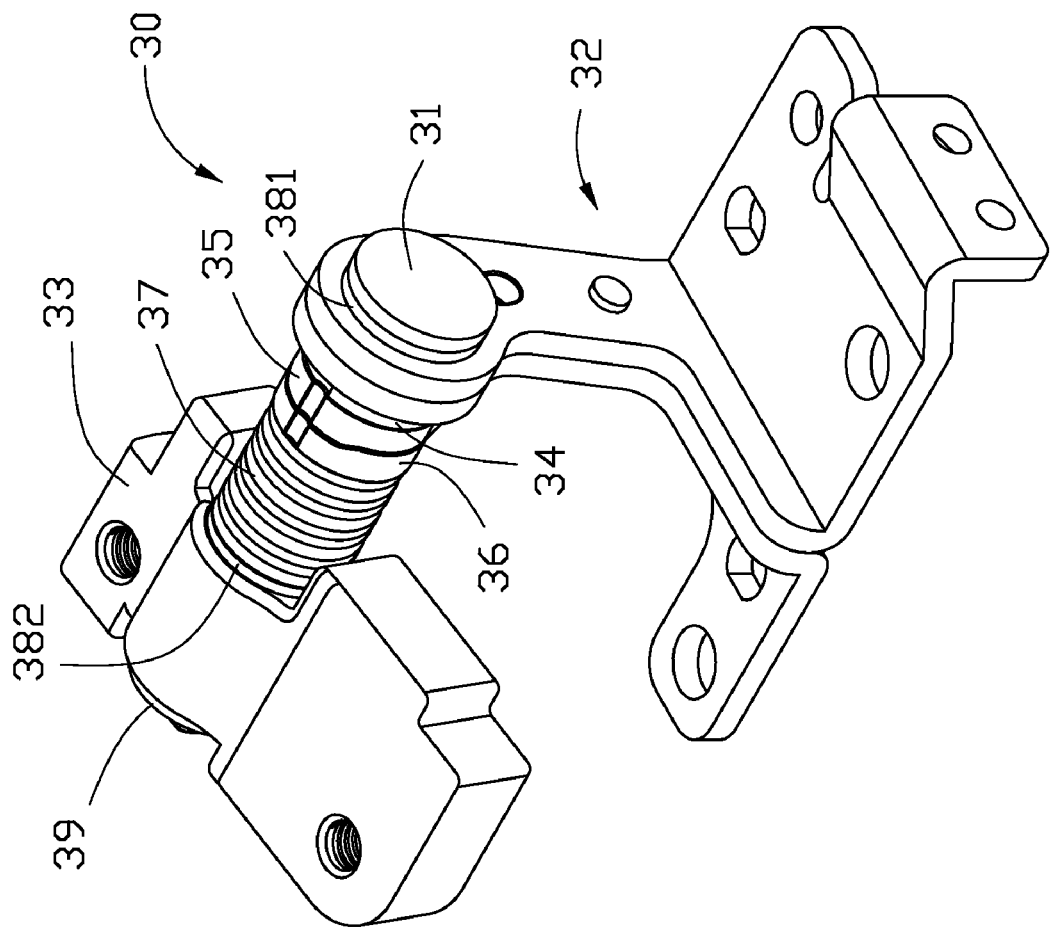
FIG. 1 is an assembled, isometric view of an embodiment of a hinge assembly, the hinge assembly including a rotatable shaft, a rotatable stand, a fixed stand, a restricting member, a cam, a cam follower, a plurality of spring washers, two friction members, a washers, and a retaining ring.

Referring to FIG. 1, an embodiment of a hinge assembly 30 includes a rotatable shaft 31, a fixed stand 32, a rotatable stand 33, a restricting member 34, a cam 35, a cam follower 36, a plurality of spring washers 37, two friction members 381, a washer 382, and a retaining ring 39.

Figure 2:
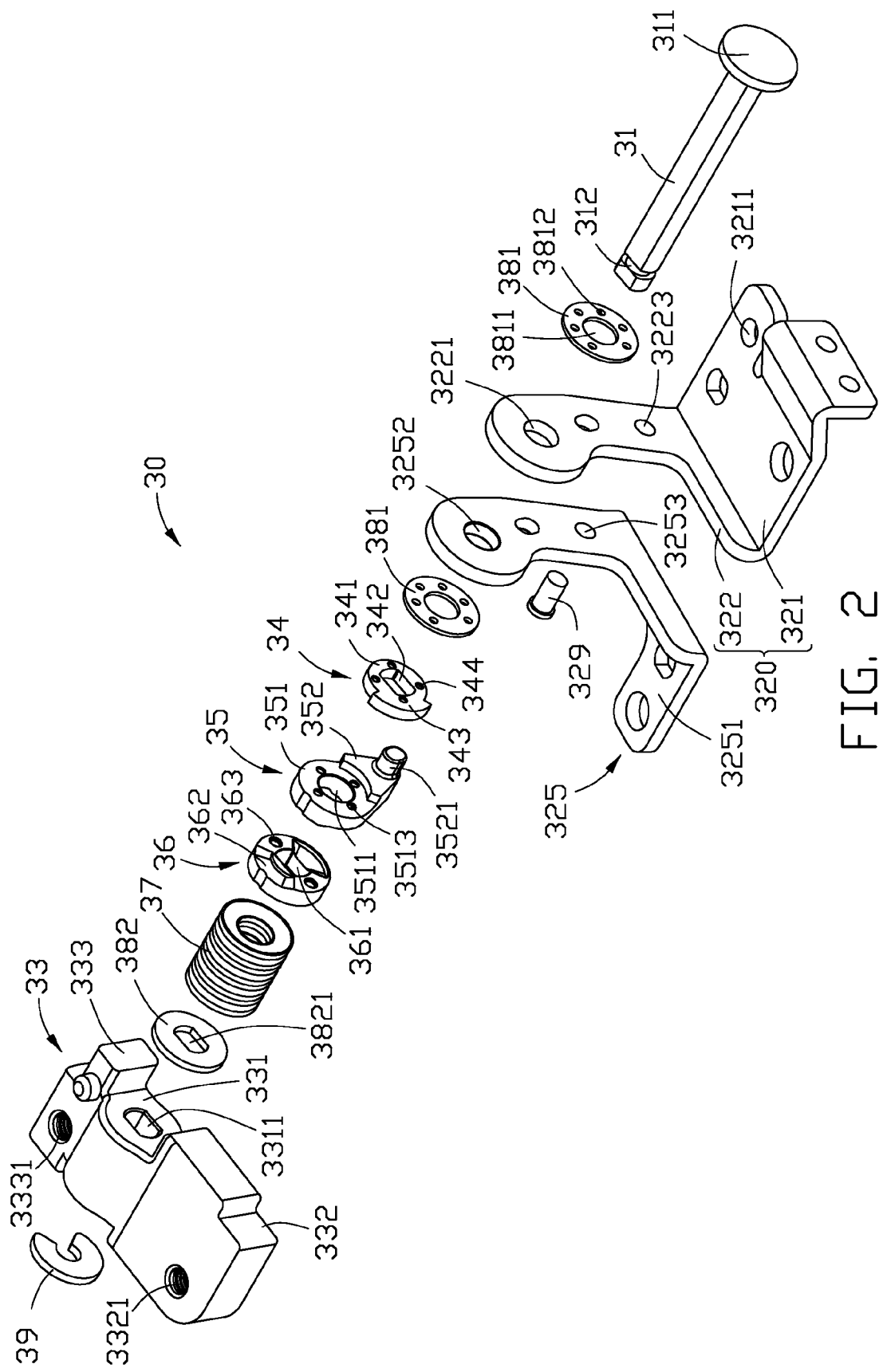
FIG. 2 is an exploded, isometric view of the hinge assembly of FIG. 1.

Referring to FIG. 2, a cross-section of the rotatable shaft 31 perpendicular to an axis of the rotatable shaft 31 is double-D shaped. A flange 311 is formed on a proximal end of the rotatable shaft 31, and an annular positioning groove 312 is defined in a distal end of the rotatable shaft 31.

Figure 3:
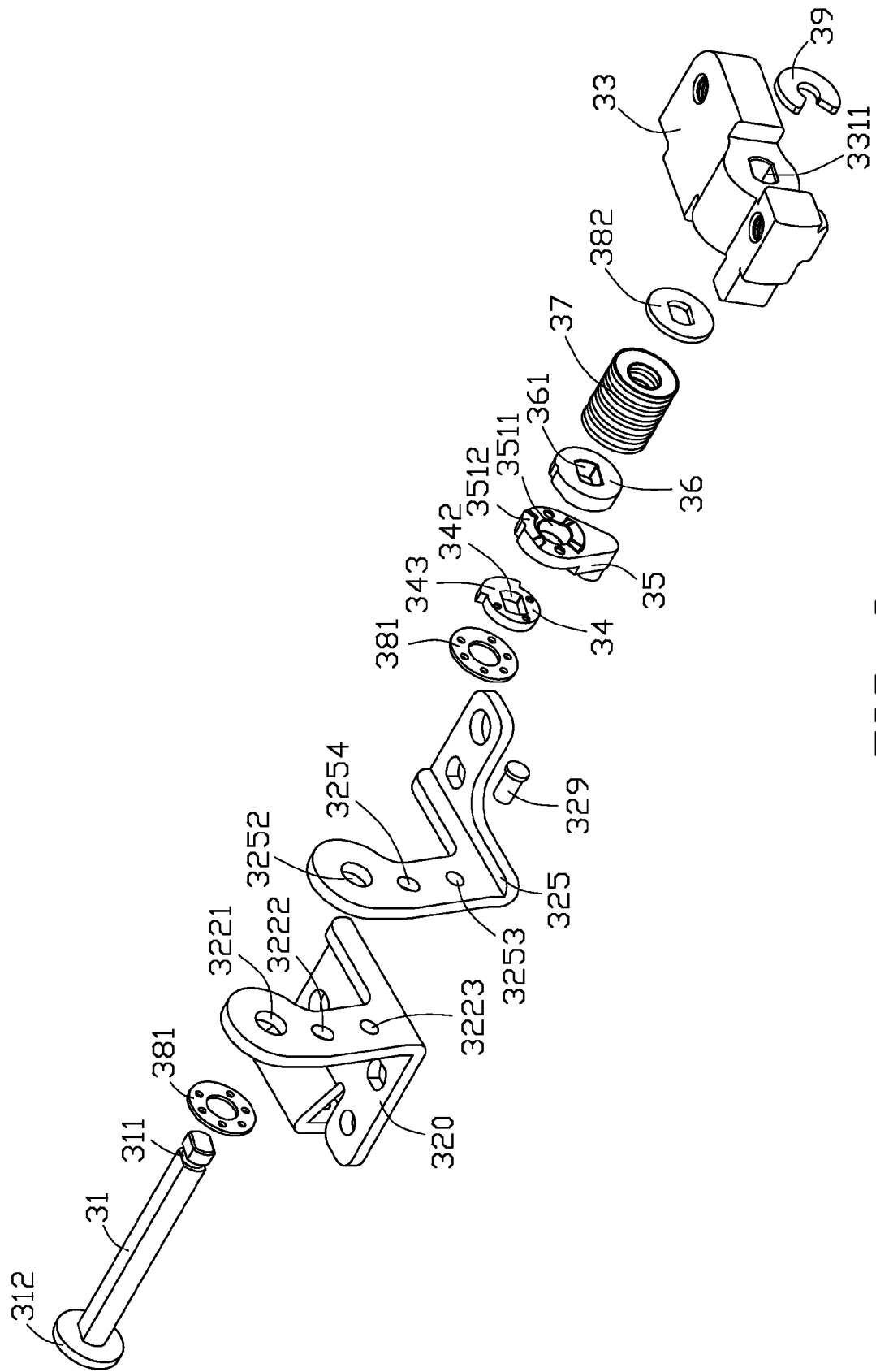
FIG. 3 is an exploded, isometric view of the hinge assembly of FIG. 1, but viewed from another aspect.
Figure 4:
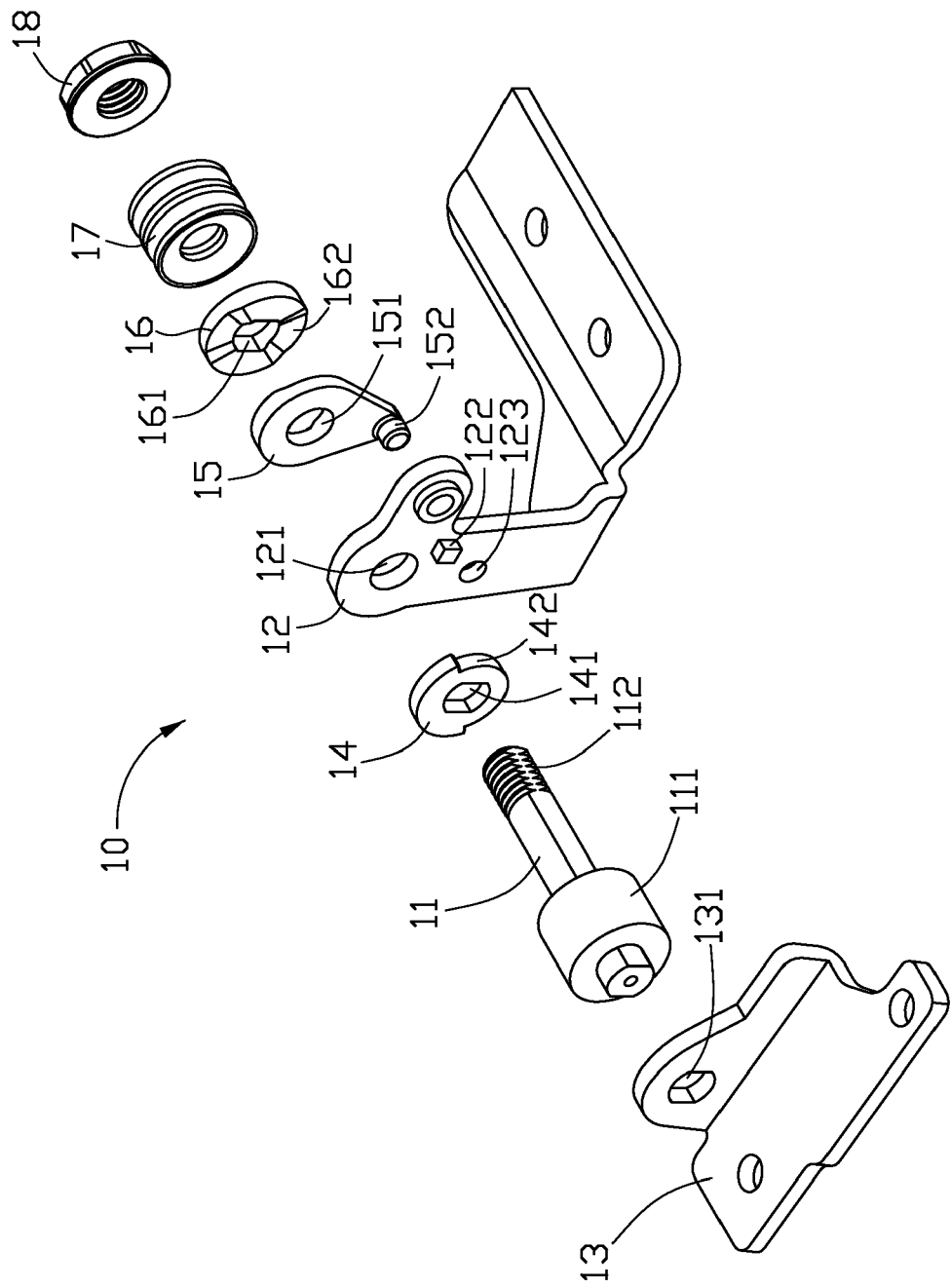
FIG. 4 is an exploded, isometric view of a typical hinge assembly.

Referring to FIG. 3, the fixed stand 32 includes a first frame 320, a second frame 325, and a rivet 329. The first frame 320 includes a fixing plate 321 and a supporting plate 322 extending substantially perpendicularly from a side of the fixing plate 321. The fixing plate 321 defines a plurality of fixing holes 3211. The supporting plate 322 defines a circular pivot hole 3221 in an end away from the fixing plate 321, an assembling hole 3222 in a middle portion of the fixing plate 321, and a riveting hole 3223 in an end adjacent to the fixing plate 321. The second frame 325 has a similar structure to the first frame 320. However, a fixing plate 3251 of the second frame 325 is smaller than the fixing plate 321 of the first frame 320. The rivet 329 is configured for fixing the second frame 325 to the first frame 320.

The rotatable stand 33 includes a pivotal portion 331, a first connecting portion 332, and a second connecting portion 333. The first connecting portion 332 and the second connecting portion 333 extend from opposite sides of the pivotal portion 331. The pivotal portion 331 defines a non-circular pivot hole 3311 corresponding to the cross-section of the shape of the rotatable shaft 31. The first connecting portion 332 defines a fixing hole 3321. The second connecting portion 333 defines a fixing hole 3331.

The restricting member 34 includes a circular main portion 341. A center of the main portion 341 defines a non-circular through hole 342 corresponding to the shape of the cross-section of the rotatable shaft 31. An arched restricting protrusion 343 extends radially from an edge of the main portion 341. The main portion 341 defines a plurality of oil grooves 344 therein.

The cam 35 includes a cylindrical assembling portion 351 and a restricting portion 352 formed at one end of the assembling portion 351. In this embodiment, the restricting portion 352 is substantially triangular-shaped, and a thickness of the restricting portion 352 is larger than a thickness of the assembling portion 351. A center of the assembling portion 351 defines a circular cam hole 3511. Two positioning protrusions 3512 are formed on a side surface of the assembling portion 351. The assembling portion 351 also defines a plurality of oil grooves 3513 therein. A fixing pole 3521 extends from the restricting portion 352.

The cam follower 36 is substantially cylindrical. A center of the cam follower 36 defines a non-circular through hole 361 corresponding to the shape of cross-section of the rotatable shaft 31. The cam follower 36 defines two positioning cutouts 362 in a side surface thereof. Each positioning cutout 362 is configured for receiving one corresponding positioning protrusion 3512 of the cam 35. The cam follower 36 also defines a plurality of oil grooves 363 in a same surface as the positioning cutouts 362.

A center of each friction member 381 defines a circular through hole 3811. The friction member 381 also defines a plurality of oil grooves 3812 on opposite sides of the friction member 381. The washer 382 defines a non-circular through hole 3821 corresponding to the shape of the cross-section of the rotatable shaft 31.

In assembling the hinge assembly 30, the shaft 31 extends through one friction member 381, the pivot hole 3221 of the first frame 320, a pivot hole 3252 of the second frame 325, another friction member 381, the through hole 342 of the restricting member 34, the cam hole 3511 of the cam 35, the through hole 361 of the cam follower 36, a plurality of spring washers 37, the washer 382, and the pivot hole 3311 of the rotatable stand 33. The retaining ring 39 engages into the positioning groove 312 of the rotatable shaft 31. The spring washers 37 produce a predetermined elastic force on the cam follower 36 along the rotatable shaft 31. The rivet 329 extends through the riveting hole 3223 of the first frame 320, and a riveting hole 3253 of the second frame 325, thereby fixing the first frame 320 to the second frame 325. The fixing pole 3521 of the second frame 325 extends through the assembling hole 3222 of the first frame 320, and an assembling hole 3254 of the second frame 325.

When the hinge assembly 30 is operated to an open position, the fixed stand 32 is rotated on the rotatable shaft 31, for example, in a clockwise direction. The rotatable shaft 31 rotates together with the fixed stand 32, and the restricting member 34 and the cam follower 36 rotate together with the rotatable shaft 31. When the restricting protrusion 343 of the restricting member 34 resists the restricting portion 352 of the cam 35, the fixed stand 32 has reached a clockwise rotatable limit and cannot rotate any further in the clockwise direction. In the clockwise rotatable limit, the fixed stand 32 has rotated to a largest angle allowable relative to the rotatable stand 33. When rotating the hinge assembly 30 to the open position, the fixed stand 32 can stop at any position (angle) between a closed position to the clockwise rotatable limit. When the hinge assembly 30 is operated to the closed position, the fixed stand 32 is rotated around the rotatable shaft 31 in a counter clockwise direction. The rotatable shaft 31, the restricting member 34, and the cam follower 36 rotate together with the fixed stand 32. The positioning protrusions 3512 of the cam 35 engages with the positioning cutouts 362, thereby fixing an angle between the fixed stand 32 and the rotatable stand 33.

The rotatable shaft 31 is inserted only through the first frame 320, the second frame 325, the friction members 381, the restricting member 34, the cam 35, the cam follower 36, a plurality of spring washers 37, the washer 382, and the rotatable stand 33. The retaining ring 39 then engages with the positioning groove 312 of the rotatable shaft 31, thus producing the predetermined elastic force along the rotatable shaft 3 so that there is no need to adjust the retaining ring 39 to produce the predetermined elastic force along the rotatable shaft 31. Therefore, an assembling efficiency of the hinge assembly 10 is high. In addition, defining the positioning groove 312 in the rotatable shaft 31 is easier than forming a threaded portion on the rotatable shaft. Therefore, a manufacturing cost of the hinge assembly 30 is low.

It should be pointed out that, the hinge assembly 30 can include only the rotatable shaft 31, the fixed stand 32, a rotatable stand 33, the washers 37, and the retaining ring 39. Here, the fixed stand 32 defines a limiting groove, a limiting protrusion is formed on the rotatable stand 33, and the limiting protrusion engages with the limiting groove of the fixed stand 32, thereby defining a largest rotating angle between the fixed stand 32 and the rotatable stand 33. The washers 37 can also be replaced by other elastic members, such as a spring. In addition, the positioning cutouts 362 of the cam follower 36 can be replaced by a plurality of positioning protrusions, and the cam 35 defines a plurality of positioning cutouts corresponding to the positioning protrusions.

It is believed that the present embodiments and their advantages will be understood from the foregoing description, and it will be apparent that various changes may be made thereto without departing from the spirit and scope of the or sacrificing all of its material advantages, the examples hereinbefore described merely being preferred or exemplary embodiments of the invention.

What is claimed is:

1. A hinge assembly, comprising:
a rotatable shaft, wherein a flange is formed on a proximal end of the rotatable shaft, and a positioning groove is defined in a distal end of the rotatable shaft;
a rotatable stand non-rotatably connected to the rotatable shaft;
a fixed stand rotatable connected to the rotatable shaft, wherein the fixed stand comprises a first frame, a second frame, and a rivet; the first frame being fixed to the second frame via the rivet;
a cam sleeved on the rotatable shaft;

a cam follower sleeved on the rotatable shaft, and engaging with the cam;

an elastic member connected to the rotatable shaft; and a retaining ring engaging in the positioning groove of the rotatable shaft, thus producing an elastic force along the rotatable shaft, wherein the rotatable stand, the fixed stand, the cam, the cam follower, and the elastic member are positioned between the flange and the positioning groove.

2. The hinge assembly as claimed in claim 1, wherein the elastic member comprises a plurality of spring washers.

3. The hinge assembly as claimed in claim 1, wherein a fixing pole is formed on the cam; the fixed stand defines an assembling hole; the fixing pole engages in the assembling hole of the fixed stand.

4. The hinge assembly as claimed in claim 3, further comprising a restricting member non-rotatably sleeved on the rotatable shaft, the restricting member comprises a main body; an arched protrusion extends radially from an edge of the main portion; the cam comprises an assembling portion and a restricting portion formed at one end of the assembling portion of the cam; the restricting member resists the assembling portion; the arched protrusion of the restricting member and the restricting portion of the cam cooperatively define a rotating angle of the rotatable stand relative to the fixed stand.

5. The hinge assembly as claimed in claim 4, wherein one of the cam and the cam follower defines a plurality of positioning cutouts, the other one of the cam and the cam follower forms a plurality of positioning protrusions configured for engaging with the positioning cutouts.

6. The hinge assembly as claimed in claim 5, wherein at least one of the restricting member, the cam, and the cam follower defines a plurality of oil grooves.

7. The hinge assembly as claimed in claim 1, further comprising two friction members sleeved on the rotatable shaft, and positioned at opposite sides of the fixed stand.

8. The hinge assembly as claimed in claim 1, further comprising a washer sleeved on the rotatable shaft, and positioned between the rotatable stand and the elastic member.

9. The hinge assembly as claimed in claim 1, wherein the rotatable stand comprises a pivotal portion, a first connecting portion, and a second connecting portion; the first connecting portion and the second connecting portion extend from opposite sides of the pivotal portion; the pivotal portion sleeved on the rotatable shaft.

10. A hinge assembly, comprising:

a rotatable shaft, wherein a flange is formed on a proximal end of the rotatable shaft, and a positioning groove is defined in a distal end of the rotatable shaft;

a rotatable stand sleeved on the rotatable shaft such that the rotatable stand rotates together with the rotatable shaft;

a fixed stand rotatable connected to the rotatable shaft;

an elastic member sleeved on the rotatable shaft;

a cam;

a cam follower sleeved on the rotatable shaft, and engaging with the cam;

a restricting member non-rotatable sleeved on the rotatable shaft, wherein the restricting member comprises a main body; an arched protrusion extends radially from an edge of the main portion; the cam comprises an assembling portion; a restricting portion is formed at one end of the assembling portion; the restricting member resists the assembling portion of the cam; the arched protrusion of the restricting member and the restricting portion of the cam cooperatively define a rotating angle of the rotatable stand relative to the fixed stand; and a retaining ring engaging in the positioning groove of the rotatable shaft, wherein the rotatable stand, the cam, the cam follower, the restricting member, and the elastic member are positioned between the flange and the positioning groove.

11. The hinge assembly as claimed in claim 10, wherein one of the cam and the cam follower defines a plurality of positioning cutouts, the other one of the cam and the cam follower forms a plurality of positioning protrusions configured for engaging with the positioning cutouts.

12. The hinge assembly as claimed in claim 11, wherein at least one of the restricting member, the cam, and the cam follower defines a plurality of oil grooves.

13. The hinge assembly as claimed in claim 10, further comprising two friction members sleeved on the rotatable shaft, and positioned at opposite sides of the fixed stand.

* * * * *